United States Patent
Lin et al.

(10) Patent No.: US 10,944,777 B2
(45) Date of Patent: *Mar. 9, 2021

(54) SYSTEM, METHOD, AND COMPUTER PROGRAM FOR DETECTION OF ANOMALOUS USER NETWORK ACTIVITY BASED ON MULTIPLE DATA SOURCES

(71) Applicant: Exabeam, Inc., Foster City, CA (US)

(72) Inventors: Derek Lin, San Mateo, CA (US); Qiaona Hu, Emerald Hills, CA (US); Domingo Mihovilovic, Menlo Park, CA (US); Sylvain Gil, San Francisco, CA (US); Barry Steiman, San Ramon, CA (US)

(73) Assignee: Exabeam, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,629

(22) Filed: Mar. 24, 2020

(65) Prior Publication Data

US 2020/0228557 A1  Jul. 16, 2020

Related U.S. Application Data

(63) Continuation of application No. 15/940,673, filed on Mar. 29, 2018, now Pat. No. 10,645,109.

(Continued)

(51) Int. Cl.
*H04L 29/06* (2006.01)
*G06N 5/04* (2006.01)
(Continued)

(52) U.S. Cl.
CPC ........ *H04L 63/1425* (2013.01); *G06F 16/285* (2019.01); *G06F 21/554* (2013.01); *G06N 5/047* (2013.01)

(58) Field of Classification Search
None
See application file for complete search history.

(56) References Cited

U.S. PATENT DOCUMENTS 6,223,985 B1   5/2001   DeLude
6,594,481 B1   7/2003   Johnson et al.
(Continued)

OTHER PUBLICATIONS

DatumBox Blog, "Machine Learning Tutorial: The Naïve Bayes Text Classifier", DatumBox Machine Learning Blog and Software Development News, Jan. 2014, pp. 1-11.

(Continued)

*Primary Examiner* — Michael Pyzocha
(74) *Attorney, Agent, or Firm* — Lessani Law Group, PC

(57) ABSTRACT

The present disclosure relates a system, method, and computer program for detecting anomalous user network activity based on multiple data sources. The system extracts user event data for n days from multiple data sources to create a baseline behavior model that reflects the user's daily volume and type of IT events. In creating the model, the system addresses data heterogeneity in multi-source logs by categorizing raw events into meta events. Thus, baseline behavior model captures the user's daily meta-event pattern and volume of IT meta events over n days. The model is created using a dimension reduction technique. The system detects any anomalous pattern and volume changes in a user's IT behavior on day n by comparing user meta-event activity on day n to the baseline behavior model. A score normalization scheme allows identification of a global threshold to flag current anomalous activity in the user population.

21 Claims, 4 Drawing Sheets

Related U.S. Application Data

(60) Provisional application No. 62/479,566, filed on Mar. 31, 2017.

(51) Int. Cl.
*G06F 16/28* (2019.01)
*G06F 21/55* (2013.01)

(56) References Cited

U.S. PATENT DOCUMENTS

| | | | |
|---|---|---|---|
| 7,668,776 | B1 | 2/2010 | Ahles |
| 8,326,788 | B2 | 12/2012 | Allen et al. |
| 8,443,443 | B2 | 5/2013 | Nordstrom et al. |
| 8,479,302 | B1 | 7/2013 | Lin |
| 8,539,088 | B2 | 9/2013 | Zheng |
| 8,606,913 | B2 | 12/2013 | Lin |
| 8,676,273 | B1 | 3/2014 | Fujisake |
| 8,881,289 | B2 | 11/2014 | Basavapatna et al. |
| 9,055,093 | B2 | 6/2015 | Borders |
| 9,081,958 | B2 | 7/2015 | Ramzan et al. |
| 9,185,095 | B1 * | 11/2015 | Moritz ............... H04L 63/0861 |
| 9,189,623 | B1 | 11/2015 | Lin et al. |
| 9,680,938 | B1 | 6/2017 | Gil et al. |
| 9,692,765 | B2 | 6/2017 | Choi et al. |
| 9,760,240 | B2 | 9/2017 | Maheshwari et al. |
| 9,779,253 | B2 | 10/2017 | Mahaffey et al. |
| 9,798,883 | B1 | 10/2017 | Gil et al. |
| 9,843,596 | B1 | 12/2017 | Averbuch et al. |
| 9,898,604 | B2 | 2/2018 | Fang et al. |
| 10,095,871 | B2 | 10/2018 | Gil et al. |
| 10,178,108 | B1 | 1/2019 | Lin et al. |
| 10,419,470 | B1 | 9/2019 | Segev et al. |
| 10,467,631 | B2 | 11/2019 | Dhurandhar et al. |
| 10,474,828 | B2 | 11/2019 | Gil et al. |
| 10,496,815 | B1 | 12/2019 | Steiman et al. |
| 2002/0107926 | A1 | 8/2002 | Lee |
| 2003/0147512 | A1 | 8/2003 | Abburi |
| 2004/0073569 | A1 | 4/2004 | Knott et al. |
| 2006/0090198 | A1 | 4/2006 | Aaron |
| 2007/0156771 | A1 | 7/2007 | Hurley et al. |
| 2007/0282778 | A1 | 12/2007 | Chan et al. |
| 2008/0040802 | A1 | 2/2008 | Pierson et al. |
| 2008/0170690 | A1 | 7/2008 | Tysowski |
| 2008/0301780 | A1 | 12/2008 | Ellison et al. |
| 2009/0144095 | A1 | 6/2009 | Shahi et al. |
| 2009/0293121 | A1 | 11/2009 | Bigus et al. |
| 2010/0125911 | A1 | 5/2010 | Bhaskaran |
| 2010/0269175 | A1 | 10/2010 | Stolfo et al. |
| 2012/0278021 | A1 | 11/2012 | Lin et al. |
| 2012/0316835 | A1 | 12/2012 | Maeda et al. |
| 2012/0316981 | A1 | 12/2012 | Hoover et al. |
| 2013/0080631 | A1 | 3/2013 | Lin |
| 2013/0117554 | A1 | 5/2013 | Ylonen |
| 2013/0197998 | A1 | 8/2013 | Buhrmann et al. |
| 2013/0227643 | A1 | 8/2013 | Mccoog et al. |
| 2013/0305357 | A1 | 11/2013 | Ayyagari et al. |
| 2013/0340028 | A1 | 12/2013 | Rajagopal et al. |
| 2014/0315519 | A1 | 10/2014 | Nielsen |
| 2015/0046969 | A1 | 2/2015 | Abuelsaad et al. |
| 2015/0121503 | A1 | 4/2015 | Xiong |
| 2015/0339477 | A1 | 11/2015 | Abrams et al. |
| 2015/0341379 | A1 | 11/2015 | Lefebvre et al. |
| 2016/0005044 | A1 | 1/2016 | Moss et al. |
| 2016/0021117 | A1 | 1/2016 | Harmon et al. |
| 2016/0306965 | A1 | 10/2016 | Iyer et al. |
| 2016/0364427 | A1 | 12/2016 | Wedgeworth, III |
| 2017/0024135 | A1 | 1/2017 | Christodorescu et al. |
| 2017/0155652 | A1 | 6/2017 | Most et al. |
| 2017/0161451 | A1 | 6/2017 | Weinstein et al. |
| 2017/0213025 | A1 | 7/2017 | Srivastav et al. |
| 2017/0236081 | A1 | 8/2017 | Grady Smith et al. |
| 2017/0264679 | A1 * | 9/2017 | Chen ..................... H04L 67/306 |
| 2017/0318034 | A1 | 11/2017 | Holland et al. |
| 2018/0004961 | A1 | 1/2018 | Gil et al. |
| 2018/0048530 | A1 | 2/2018 | Nikitaki et al. |
| 2018/0144139 | A1 | 5/2018 | Cheng et al. |
| 2018/0165554 | A1 | 6/2018 | Zhang et al. |
| 2018/0234443 | A1 | 8/2018 | Wolkov et al. |
| 2018/0307994 | A1 | 10/2018 | Cheng et al. |
| 2019/0034641 | A1 | 1/2019 | Gil et al. |
| 2019/0124045 | A1 | 4/2019 | Zong et al. |
| 2019/0213247 | A1 | 7/2019 | Pala et al. |
| 2019/0334784 | A1 | 10/2019 | Kvernvik et al. |
| 2020/0082098 | A1 | 3/2020 | Gil et al. |
| 2020/0228557 | A1 * | 7/2020 | Lin ....................... G06F 21/554 |

OTHER PUBLICATIONS

Freeman, David, et al., "Who are you? A Statistical Approach to Measuring User Authenticity", NDSS, Feb. 2016, pp. 1-15.

Malik, Hassan, et al., "Automatic Training Data Cleaning for Text Classification", 11th IEEE International Conference on Data Mining Workshops, 2011, pp. 442-449.

Wang, Alex Hai, "Don't Follow Me Spam Detection in Twitter", International Conference on Security and Cryptography, 2010, pp. 1-10.

Chen, Jinghui, et al., "Outlier Detection with Autoencoder Ensembles", Proceedings of the 2017 SIAM International Conference on Data Mining, pp. 90-98.

Ioannidis, Yannis, "The History of Histograms (abridged)", Proceedings of the 29th VLDB Conference (2003), pp. 1-12.

* cited by examiner

Example Meta Events

| meta event | Description |
|---|---|
| account-creation | an account has been created by a user |
| account-deleted | an account has been deleted by a user |
| account-disabled | an account has been disabled by a user |
| account-enabled | an account has been enabled by a user |
| account-lockout | an account has been locked out |
| account-password-change | an account password has been changed |
| account-password-reset | an account password has been reset |
| account-switch | a user is impersonating another account |
| app-activity | application activity by a user |
| app-login | application login by user |
| audit-log-clear | an audit log clearance on the asset |
| audit-policy-change | an audit policy change on the asset |
| authentication-failed | failed authentication either performed from a public IP address or from an internal network address |
| authentication-successful | successful authentication either performed from a public IP address or from an internal network address |
| batch-logon | a non-interactive batch logon on the asset |
| computer-logon | computer logon |
| config-change | modification in the configuration |
| database-alert | an alert about abnormal activity in the database |
| database-login | database login by user |
| database-query | database query by user |
| dlp-alert | an alert reported by dlp product running on the endpoints |
| dlp-email-alert-in | incoming email successfully received |
| dlp-email-alert-in failed | incoming email failed to be received |
| dlp-email-alert-out | outgoing email successfully sent |
| dlp-email-alert-out-failed | outgoing email failed to be sent |
| ds-access | access to an active directory object |
| failed-app-login | application login by user |
| failed-ds-access | failed to access an active directory object |
| failed-logon | an account has failed to logon |
| failed-physical-access | physical access denied, a user failed to open a door or a gate using his badge |
| failed-vpn-login | failed remote access VPN login either perform from a public IP address or from an internal network address |
| file-alert | alerts reported by file integrity monitoring products like Tripwire that indicate the change in critical/system file |
| file-delete | file delete event which indicates that the user has performed delete operation on a file |
| file-permission-change | file permissions change event which indicates that the file/folder access permissions have been modified |
| file-read | the user has performed read/download operation on a file |
| file-write | the user has performed create/edit/move/upload operation on a file |
| kerberos-logon | an interactive logon on the asset |
| local-logon | a local interactive logon on the asset |
| member-added | account group membership addition event that a user has been added to a domain group |
| member-removed | account group membership removal event that a user has been removed from a domain group |
| nac-failed-logon | nac-failed-logon |
| nac-logon | network access granted |
| network-alert | alert reported by a network security product such as an IDS that indicate suspicious activity in the network |
| ntlm-logon | an interactive logon on the asset |
| physical-access | a user used his badge to open a door or a gate |
| print-activity | printing activity by user |
| privileged-access | the user obtained special privileges |
| privileged-object-access | the user obtained special privileges on objects |
| process-alert | the user has executed a process that triggered an alert |
| process-created | the user has executed a process on the host |
| process-network | end point process network activity, that this process has create |
| remote-access | a non-interactive logon on the asset |
| remote-logon | an interactive logon on the asset |
| security-alert | alert reported by a security product running on the endpoints |
| service-logon | a non-interactive service logon on the asset |
| usb-activity | USB activity was detected |
| user-access | user access to resource |
| vpn-login | remote access VPN login either perform from a public IP address or from an internal network address |
| vpn-logout | remote access VPN logoff |
| web-activity-allowed | web activity, this user has accessed a web resource via a web monitoring gateway such as a proxy |
| web-activity-any | any web activity |
| web-activity-denied | this user has attempted to accessed a web resource but was blocked by a restricted policy |
| winsession-disconnect | the user disconnected from an existing Terminal Services session |
| workstation-locked | the user has locked their workstation |
| workstation-unlocked | the user has unlocked their workstation |

*FIG. 4*

SYSTEM, METHOD, AND COMPUTER PROGRAM FOR DETECTION OF ANOMALOUS USER NETWORK ACTIVITY BASED ON MULTIPLE DATA SOURCES

RELATED APPLICATIONS

This application is a continuation of U.S. patent application Ser. No. 15/940,673, filed on Mar. 29, 2018, and titled "System, Method, and Computer Program for Detection of Anomalous User Network Activity Based on Multiple Data Sources," which claims the benefit of U.S. Provisional Application No. 62/479,566, filed on Mar. 31, 2017, and titled "UEBA System and Method for Detecting a User's Daily Activity Change." The contents of the foregoing patent and provisional applications are incorporated by reference as if fully disclosed herein.

BACKGROUND OF THE INVENTION

1. Field of the Invention

This invention relates generally to security analytics in computer networks, and more specifically to detecting anomalous user network activity based on multiple data sources.

2. Description of the Background Art

Major network and data breaches have become larger in scale and more serious in recent years from theft of corporate data to targeted campaigns against governments. The need to identify network security threats has never been greater. Data theft can happen within an enterprise in at least the following two ways. One, an ill-intentioned insider tries to discover and access crown jewel servers containing confidential data assets such as personal identifiable information. Two, malware is installed inside the network, via a phishing attack for example. The malware establishes contact with external Command-and-Control servers controlled by an adversary. An adversary then has access to the network for further reconnaissance and exploration; such activity is known as "lateral movement," which eventually leads to data exfiltration. Both malicious insider and adversary-controlled activities often manifest themselves in anomalous changes from historical habitual patterns.

In addition to the above, anomalous activities arising from non-malicious intent are often of interest for an enterprise security analyst. They are indicative of network resource misuse or policy violation. For example, a user account is used to conduct a network administrative task that should have been performed via an administrative account or a service account. Administrative activity or network service activity may look anomalous against a normal network user's day-to-day activity. Discovering these anomalies and taking actions to address them is good practice for security hygiene.

Enterprise security products generate a large variety and volume of event data logging user activities. For example, Microsoft's Active Directory (AD) logs record user-to-machine authentication events in AD domain controllers on a Windows environment; firewall security products generate alerts for user activities crossing the network perimeter; endpoint products track file actions such as file deletion and creation, etc. Today commercial Security Information and Event Management (SIEM) systems log these events in data repositories for post-incident forensic investigation. Beyond supporting the forensics, SIEM systems rely on correlation rules for threat detection. For example, for a VPN log, a sample rule is to raise an alert if the number of VPN logins exceeds more than 20 times in 5 minutes. Or, for an identity Access and Management (IAM) log, a sample rule is to raise an alert if a same user account is created and deleted in a 24-hour period. However, correlation rules are single dimensional in that they are each designed to monitor events per a single data source. Events from one data source do not interact with events from other data sources to allow a more comprehensive evaluation. In addition, correlation rules are point-in-time indicators and do not explore behavior profiling over a long-time range.

There is much research work in detecting anomalous user behavior for threat detection. For example, one proposed solution categorizes Unix commands and Windows application from the host audit logs and applies machine learning to detect malicious intent. See M. B. Salem and S. J. Stolfo, "Masquerade attack detection using a search-behavior modeling approach," *Columbia University, Computer Science Department, Technical Report CUCS*-027-09, 2009. A second solution uses a graph-based approach to classify users and detect intrusion from a network authentication log. See A. D. Kent, L. M. Liebrock, and J. C. Neil, "Authentication graphs: Analyzing user behavior within an enterprise network," *Computers & Security*, vol. 48, pp. 150-166, 2015. A third solution uses a Hidden Markov Model to detect anomalies in document accesses and in queries from the log of a document control system. See P. Thompson, "Weak models for insider threat detection," in *Proc. of SPIE Vol.*, vol. 5403, 2004, p. 41.

Each of the above proposed solutions targets a specific, single log source from a given domain. Other methods construct detectors, one for each domain, before combining them together. For example, one method develops 76 detectors, each defined per activity type such as browsing, searching, downloading, and printing, then uses a Bayesian network over the detectors for ranking. See M. Maloof and G. Stephens, "Elicit: A System for detecting insiders who violate need-to-know," in *Recent Advances in Intrusion Detection*. Springer, 2007, pp. 146-166. However, this type of solution still requires one detector per data source.

Similarly, existing commercial applications for user anomaly detection rely on rules against single log sources. User Behavior Analytics (UBA) systems build indicators based on statistical profiles to find anomalies from event activities per log source.

User behavior on an enterprise network is inherently multifaceted, spanning across multiple type of tasks and activities that a user can do. No one data source captures all these events. Instead, the events are captured across many data sources which result in an inhomogeneous collection of data. Because the above-described systems and solutions detect anomalies one data source at a time, they do not detect (1) changes in a user's own behavior pattern across event activities from multiple sources during a period of time (e.g., a day, week, etc.) or (2) increases in the volume of various event activities from multiple sources during a period of time (e.g., a day, week, etc.). When one's activities suddenly changes dramatically over a relatively short period of time (e.g., a day, week, etc.), usually it indicates something is happening with respect to the person (e.g. taking PTO, account being hacked, stealing company's information, working overtime). Some of these activities are innocuous, but some of them could be harmful to the company. Therefore, there is demand for UEBA system that detects changes during a period of time in either (1) a user's own event activity patterns or (2) the volume of the user's event activities.

SUMMARY OF THE DISCLOSURE

The present disclosure relates a system, method, and computer program for detecting anomalous user network activity based on multiple data sources. Specifically, the method detects pattern and volume changes in a user's network behavior during a period of time based on multiple data sources. The method is performed by a computer system that detects cyber threats in a network and performs a risk assessment of user network activity (i.e., user information Technology (IT) activity).

In one embodiment, the system extracts user event data for n days from multiple data sources to create a baseline behavior model P that reflects the user's daily volume and type of IT events. In creating the model P, the system addresses data heterogeneity in multi-source logs by categorizing raw events into meta events. Thus, baseline behavior model captures the user's daily meta-event pattern and volume of IT meta events over n days (i.e., days 0 to n−1). The model is created using a dimension reduction technique, such as Principal Component Analysis (PCA).

The system detects any anomalous pattern and volume changes in a user's IT behavior on day n by comparing user meta-event activity on day n to the baseline behavior model P. A score normalization scheme allows identification of a global threshold to flag current anomalous activity in the user population. In response to detecting anomalous user meta-event activity on day n (i.e., deviation from the model in excess of the global threshold), the system raises a risk assessment associated with user's network activities on day n. In response to the user's activity on day n being consistent with days 0 to n−1 (i.e., deviation from the model is below the global threshold), the system updates the baseline behavior model with the user's meta event activity for day n.

In one embodiment, creating the baseline behavior model comprises:
receiving raw event logs from multiple data sources for a period of n days from days 0 to n−1;
categorizing raw event logs into meta events using an event taxonomy;
for each of the days 0 to n−1, creating a vector with a weighted count of each unique meta event observed that day;
creating a matrix, M, with the vectors for days 0 to n−1; and
modeling the data in the matrix (M) from day 0 to day n−1 using a dimension reduction technique to create the resulting baseline behavior model P.

In one embodiment, detecting any anomalous pattern and volume changes in a user's IT behavior on day n comprises:
creating a vector, $f_n$, with a weighted count of each unique meta event observed on day n;
scoring the activity vector $f_n$ by measuring the magnitude of its reconstruction error as the difference between $f_n$ and $f_n PP^T$;
normalizing the reconstruction error; and
comparing the normalized reconstruction error to an anomaly threshold.

For example purposes, the method is described herein with respect to detecting anomalous user behavior over the course of a day. However, in certain embodiments, the method is applied to other periods of time.

BRIEF DESCRIPTION OF THE DRAWINGS

FIG. 4 is a table that lists example meta events.

DETAILED DESCRIPTION OF THE PREFERRED EMBODIMENTS

The present disclosure describes a system, method, and computer program for detecting pattern and volume changes in a user's IT behavior during a period of time based on multiple data sources. In one embodiment, the method detects whether a user's observed event activity across multiple sources in a current day is inconsistent with all past daily events in a sliding window of n days from day 0 to n−1. For purposes of this disclosure, "event" includes not only logon events, but can also include access activities within the network, such as a user accessing machines, documents, or applications. An event may also include other user IT activities in a network.

As stated above, the method is performed by a computer system that detects cyber threats in a network and performs a risk assessment of user network activity. The computer system may be a user behavior analytics (UBA) system or a user-and-entity behavior analytics system (UEBA). An example of a UBA/UEBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

The method includes three parts:

1. Creating a baseline behavior model: The baseline behavior model captures a user's periodic pattern and volume of meta events across multiple data sources.

2. Detecting a change: For each new day or other period of time, the system detects any changes to a user's pattern and volume of meta events by comparing the meta events of that day (or other period of time) to the baseline behavior model. A score normalization scheme allows identification of a global threshold to flag current anomalous activity in the user population.

3. Updating the baseline behavior model: If no anomalous change is detected in the new period, the system adds the activity data from the new period to the baseline behavior model.

Each of these steps are described in more detail below with respect to the following context: detecting whether a user's meta-event activity on a current day is inconsistent with all past daily events in a sliding window of n days from day 0 to n−1. However, the method could apply to other fixed or variable periods of time. For example, the method can detect whether a user meta event activity in a current logon session is inconsistent with all past logon session in a sliding window of n logon sessions from sessions 0 to n−1.

Creating the Baseline Behavior Model

Figure 1:
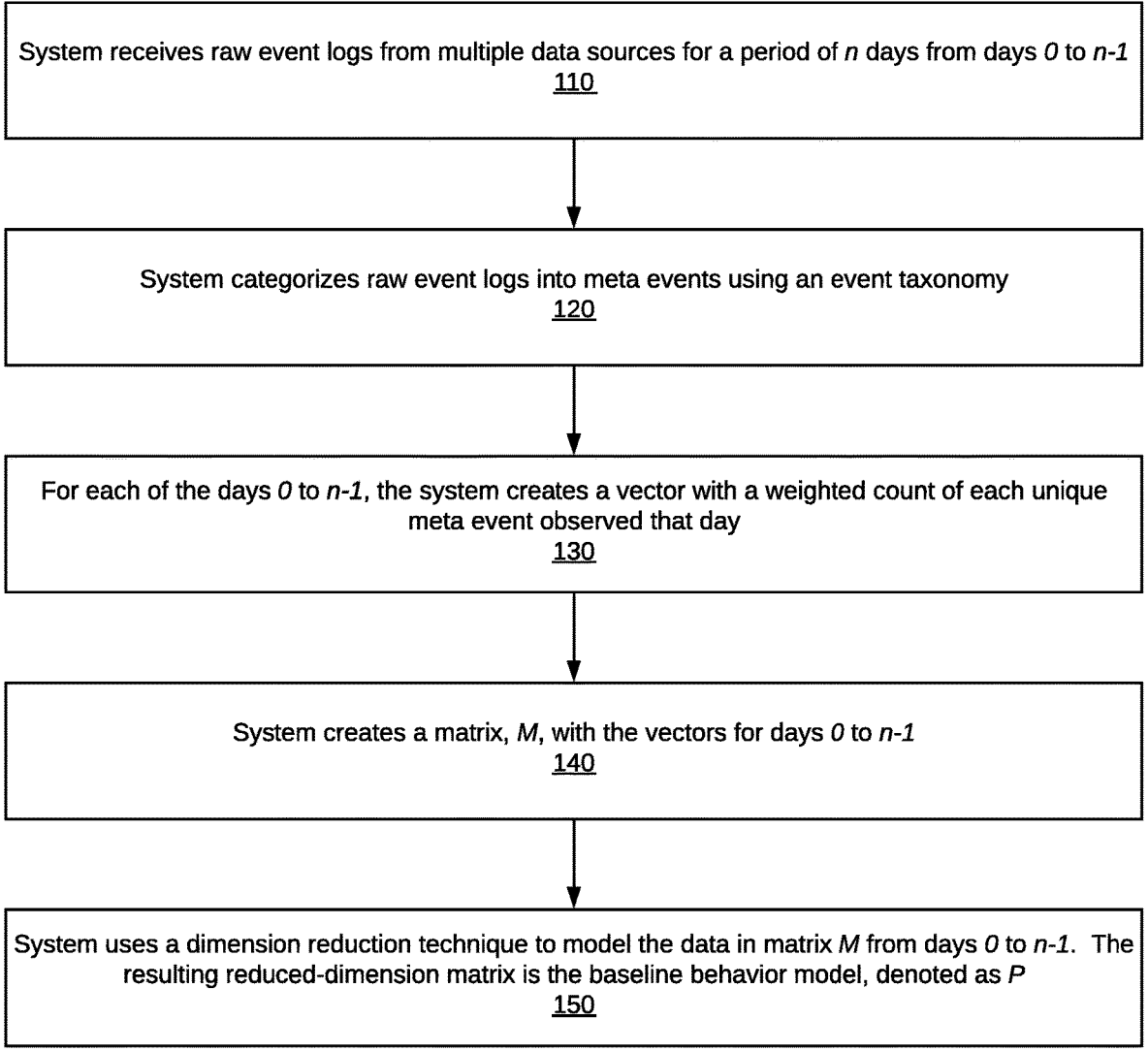
FIG. 1 is a flowchart that illustrates a method, according to one embodiment, for creating a baseline behavior model that captures a user's daily pattern of meta events over n days based on multiple sources.

FIG. 1 illustrated a method for creating a baseline behavior model that captures a user's daily pattern and volume of meta events over n days based on multiple data sources. The system receives raw event logs from multiple data sources for a period of n days from days 0 to n−1 (step 110). Example of the types of data sources and corresponding events are set forth below:

- Active Directory service from MICROSOFT: authentication and authorization events for all users and computers in a Windows domain type network.
- Identity management products: events for user or computer account creation and deletion.
- Web proxy products: web activity events, such as blocking connections to potentially malicious domains or URLs.
- Data loss prevention products: security events for alerts relating to data exfiltration.
- VPN products: virtual private network login events such as login success or failure.
- Data security products: events for database activities, such as database queries.

Event logs from the different products are inhomogeneous. To address data heterogeneity, the system categorizes raw event logs into meta events using an event taxonomy (step 120). The event taxonomy is a mapping of raw event logs to meta events. Meta events are broad categories that describe the nature of raw events across different services and products. For example, a VPN-logon meta event represents successful logon events across the network perimeter from any supported VPN product installed in the network. As another example, a Kerberos-logon meta event represents all Kerberos protocol-based logon. A remote-access meta event represents all remote file-share or printer access. The table in FIG. 4 lists examples of meta events.

For each of the days 0 to n−1, the system creates a vector with a weighted count of each unique meta event observed that day (step 130). For example, a user's traffic on a day can be denoted as a vector of:

$$(c_{r1}, c_{r2}, \ldots c_{rp})$$

where $c_{ri}$ represents the raw count of meta event $r_i$ observed on the day. p is the number of available meta events. In an alternate embodiment, $c_{ri}$ represents the number of active windows on the day in which the meta event $r_i$ was observed. For example, a day may be divided into 10-minute windows, and $c_{ri}$ can represent the number of 10-minute window in which $r_i$ is observed in the applicable day.

For behavior modeling purposes, not all meta events are regarded with equal importance. Anomalies dues to changes in common meta events (e.g., Kerberos-logon or ntlm-logon) are less interesting than those with rarer occurring meta events (e.g., account-password-change or member-added). To reflect their relative importance, a weight factor $w_{ri}$ is applied to $c_{ri}$. In one embodiment, $w_{ri}$ is defined as:

$$\omega_{r_i} = \log\left(\frac{\sum_{j=1}^{p} d_{r_j}}{|d_{r_i}|}\right)$$

where $d_{ri}$ is the count of unique tuples of user and active hour observed over n days of data for meta event $r_i$. In this embodiment, a user's activity vector for day t is denoted as:

$$f_t = (w_{r1}c_{r1}, w_{r2}c_{r2}, w_{rp}c_{rp})$$

The term "weighted count" herein may refer to a weighted raw count or a weighted active-window count.

The system creates a matrix, M, with the vectors for days 0 to n−1 (step 140). The matrix represents the user's meta activity over n days. The matrix is of size n by p and is denoted as:

$$M = \begin{bmatrix} f_0 \\ f_1 \\ \ldots \\ f_t \\ \ldots \\ f_{n-1} \end{bmatrix}$$

where $0 <= t >= n-1$

A dimension reduction technique, such as Principal Component Analysis (PCA), is used to model the data in the matrix (M) from day 0 to day n−1 (step 150). The resulting reduced-dimension matrix is the baseline behavior model. In one embodiment, step 150 is performed as follows:

- With the column-wise means removed from M, PCA is performed on $M^T M$ to obtain a matrix of eigenvectors via singular value decomposition (SVD) or $M = USV^T$. The singular vectors from V are eigenvectors of $M^T M$.
- The top K eigenvectors are denoted as P which captures the "typical" meta event frequency patterns in the column space of M. P is the baseline behavior model. One criteria to choose the top K largest eigenvalues $a_k$ is that the ratio between the sum of these K eigenvalues and the sum of all eigenvalues is greater than a prescribed threshold h. That is:

$$\frac{\sum_{k=1}^{K} a_k}{\sum_{k=1}^{n} a_k} >= h$$

The threshold h controls how closely the subspace spanned by the chosen eigenvectors should approximate the original space. For instance, if h is 0.95, then the system will select the top K eigenvectors that explain 95% of the variance in the original data.

Detecting Anomalous Daily Pattern and Volume Behavior

Figure 2:
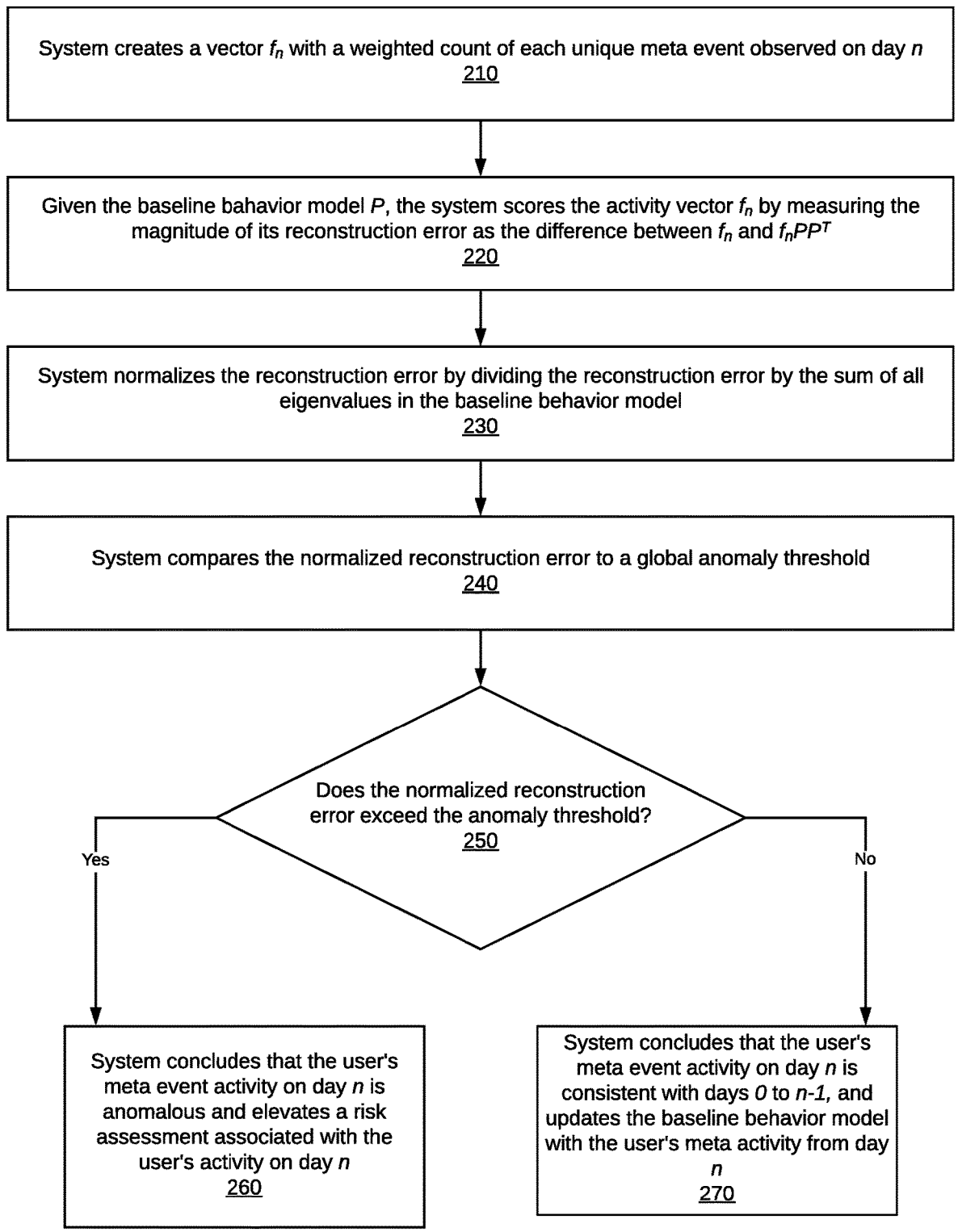
FIG. 2 is a flowchart that illustrates a method, according to one embodiment, for detecting pattern and volume changes in a user's daily IT behavior based on the baseline behavior model.

FIG. 2 illustrates a method for detecting pattern and volume changes in a user's IT behavior on day n using the baseline behavior model (denoted as P). Using the same method described with respect to step 110-130 for days 0- to n−1 (i.e., receive raw event logs, categorize raw event logs into meta events, etc.), the system creates a vector, $f_n$, with a weighted count of each unique meta event observed on day n (step 210). Given the baseline behavior model P, the system scores the activity vector $f_n$ by measuring the magnitude of its reconstruction error as the difference between $f_n$ and $f_n PP^T$ (step 220). The reconstruction error $e_n$ is:

$$\|f_n - f_n PP^T\|$$

where $\|.\|$ denotes the magnitude of a vector.

Here $f_n PP^T$ is the rank K approximation to the vector $f_n$. If the approximation is "good" (i.e., if the vector $f_n$ is explained well by the space spanned by the baseline behavior model P) then the corresponding reconstruction error $e_n$ is small. On the other hand, if the vector $f_n$ cannot be explained well by the space spanned by the baseline behavior model P, then the reconstruction $e_n$ tends to be large, indicating a potential anomaly for the user on day n.

As described below, the system raises risk assessments for reconstruction errors that exceed a threshold. However, values of the reconstruction error $e_n$ across users are not directly comparable since users' models are independently derived and therefore users' $e_n$ are unrelated to one another. Consequently, before doing the threshold comparison, the system first normalizes the reconstruction error $e_n$ in proportion to the size of its respective data spanned by the K eigenvectors (step 230). Specifically, the system divides the reconstruction error $e_n$ by the total variance of the projected space of M P (i.e., the sum of top K eigenvalues) to obtain the normalized reconstruction error, denoted herein as $e_n'$. This is represented mathematically as:

$$e_n' = \frac{e_n}{\sum_{k=1}^{K} a_k}$$

Where $\sum_{k=1}^{K} a_k$ is the sum of the top K eigenvalues.

The system compares the normalized reconstruction error to a global anomaly threshold (step 240). The threshold is based on the distribution of the normalized error residuals $e_n'$ across the user population in the network. In one embodiment, the threshold is set that it flags about 0.5% of users among all the user population in the network (or between 0.4% and 0.6% of users).

If the normalized reconstruction error $e_n'$ exceeds the threshold, this indicates that the pattern and volume of user's event activity on day n is inconsistent with the user's pattern and volume of event activity on days 0 to n−1 (i.e., the behavior on day n is considered anomalous). Consequently, the system elevates a risk assessment associated with the user's IT activities on day n (steps 250, 260). Raising a risk assessment can include adding points to a risk score for a user's logon session, as described in U.S. Pat. No. 9,798,883 (which is incorporated by reference herein). In addition or alternatively, raising a risk assessment may be issuing an alert for the user's current network session.

If the normalized reconstruction error $e_n'$ is lower than the threshold, the user's behavior on day n is considered consistent with past behavior on days 0 to n−1, and the system updates the behavior model with the user's meta event activity from day n (steps 250, 270). In other words, the vector $f_n$ is added to the matrix M, and a dimension reduction technique (e.g., PCA) is used to model the updated matrix M, resulting in an updated baseline behavior model. In one embodiment, the baseline behavior model is based on a sliding window of n days. In this case, when the vector $f_n$ is added to the matrix, $f_0$ is removed from it.

Not all anomalies are interesting, particularly those with low volume events. Therefore, in one embodiment, days of low volume activities, such as during holidays or weekends, are excluded in creating the baseline behavior model and evaluating user behavior.

In one embodiment, the system calculates a "low active" day threshold for each user. What is considered a "low active" day for a user may depend on the user and his/her position within the organization. For example, a software developer's low active days may look like a normal day for a sales contractor. Therefore, a threshold of "low active days" is calculated for each user based on their training data, assuming their daily activities are normal distributed. Days that do not satisfy the "low active" threshold for a user are excluded from training and evaluation for that user.

Figure 3:
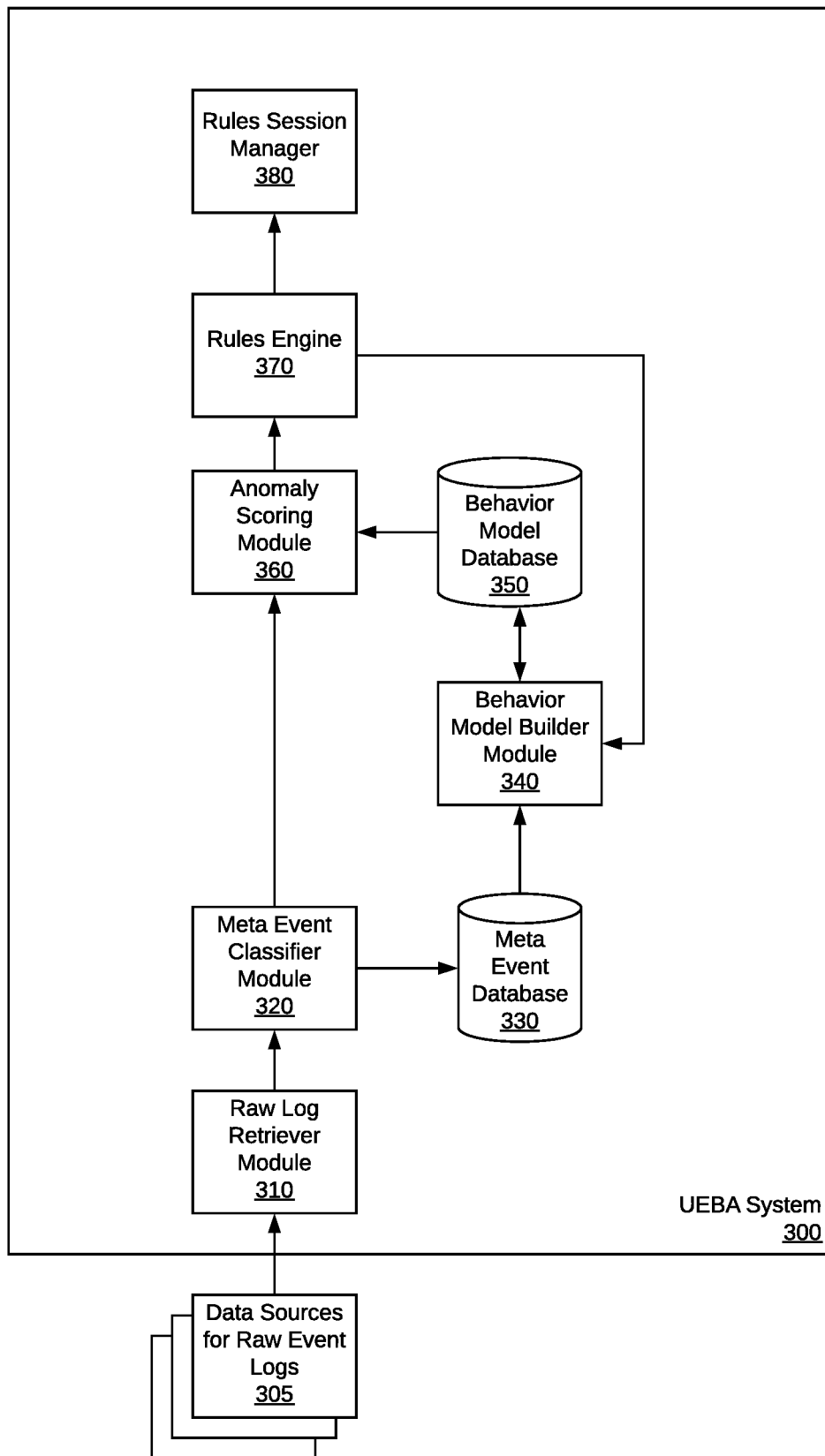
FIG. 3 is a block diagram that illustrates an example software architecture according to one embodiment.

FIG. 3 illustrates an example UEBA system 300 for performing the methods described herein. The methods described herein may be implemented in other systems and are not limited to system 300. A Raw Log Retriever module 310 retrieves raw event logs from multiple data sources 305. A Meta-Event Classifier module 320 classifies raw events into meta events based on an event taxonomy. Meta events for stored in Meta-Event Database 330. The Behavior Model Builder 340 accesses the meta events to create baseline behavior models for user as described with respect to FIG. 1. Baseline behavior models are stores in Behavior Model Database 350. The Anomaly Detection Module 360 uses the meta events from day n and the baseline behavior model for days 0-n−1 to calculate the normalized reconstruction error for a user on day n (as described with respect to FIG. 2). The Rules Engine 370 determines whether the normalized reconstruction error score is above the global anomaly threshold. If so, the Rules Session Manager 380 adds risk points to the user's risk session score. Otherwise, the Behavior Model Builder 360 updates the user's baseline behavior model with the meta events from day n. At the end of or during a user logon session, the Risk Session Manager outputs flagged/high risk session scores in a user interface (not shown) for a security analyst or system administrator.

Those skilled in the art will appreciate that a UEBA system has other modules not shown in FIG. 3, as they are not relevant to the present disclosure. An example of a UEBA system and how to calculate a risk score is described in U.S. Pat. No. 9,798,883, which is incorporated by reference above.

The methods described with respect to FIGS. 1-4 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

The symbols K and n herein represent integers greater than 1.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for detecting anomalous IT pattern and volume event behavior for a user during a period of time based on multiple data sources, the method comprising:

creating a baseline behavior model P that captures a user's logon session pattern and volume of IT meta events over n logon sessions based on multiple data sources, wherein creating the baseline behavior model comprises:
receiving raw event logs from multiple data sources for a period of n logon sessions from sessions 0 to n−1;
categorizing raw event logs into meta events using an event taxonomy;
for each of the sessions 0 to n−1, creating a vector with a weighted count of each unique meta event observed in that logon session;
creating a matrix, M, with the vectors for sessions 0 to n−1; and modeling the data in the matrix (M) from sessions 0 to session n−1 using a dimension reduction technique to create the resulting baseline behavior model P;

determining whether there are anomalous pattern and volume changes in a user's IT behavior in session n using the baseline behavior model P, wherein the determining step comprises:

creating a vector, $f_n$, with a weighted count of each unique meta event observed in session n;

scoring the activity vector $f_n$ by measuring the magnitude of its reconstruction error as the difference between $f_n$ and $f_n PP^T$;

normalizing the reconstruction error; and comparing the normalized reconstruction error to an anomaly threshold;

in response to the normalized reconstruction error satisfying the anomaly threshold, concluding that the user's meta event behavior in session n is anomalous and elevating a risk assessment associated with the user's IT activities in session n; and in response to the normalized reconstruction error not satisfying the anomaly threshold, updating the baseline behavior model with the user's meta event activity from session n.

2. The method of claim 1, wherein the dimension reduction technique is Principal Component Analysis (PCA).

3. The method of claim 2, wherein the baseline behavior model P is the top K eigenvectors of $M^T M$.

4. The method of claim 3, wherein normalizing the reconstruction error comprises dividing the reconstruction error by the sum of all eigenvalues in the baseline behavior model P.

5. The method of claim 1, wherein elevating the risk assessment comprises adding points to a risk score for the user's logon session.

6. The method of claim 1, wherein the events include a plurality of the following: log-on events, account-creation events, account-deletion events, account-password-change events, and events relates to access of machines, documents, and applications.

7. The method of claim 1, wherein the threshold is set so that the normalized reconstruction error is above the threshold for between 0.4% and 0.6% of users in the network.

8. A non-transitory computer-readable medium comprising a computer program, that, when executed by a computer system, enables the computer system to perform the following method for detecting anomalous IT pattern and volume event behavior for a user during a period of time based on multiple data sources, the method comprising:

creating a baseline behavior model P that captures a user's logon session pattern and volume of IT meta events over n logon sessions based on multiple data sources, wherein creating the baseline behavior model comprises:

receiving raw event logs from multiple data sources for a period of n logon sessions from sessions 0 to n−1;

categorizing raw event logs into meta events using an event taxonomy;

for each of the sessions 0 to n−1, creating a vector with a weighted count of each unique meta event observed in that logon session;

creating a matrix, M, with the vectors for sessions 0 to n−1; and modeling the data in the matrix (M) from session 0 to session n−1 using a dimension reduction technique to create the resulting baseline behavior model P;

determining whether there are anomalous pattern and volume changes in a user's IT behavior in session n using the baseline behavior model P, wherein the determining step comprises:

creating a vector, $f_n$, with a weighted count of each unique meta event observed in session n;

scoring the activity vector $f_n$ by measuring the magnitude of its reconstruction error as the difference between $f_n$ and $f_n PP^T$;

normalizing the reconstruction error; and comparing the normalized reconstruction error to an anomaly threshold;

in response to the normalized reconstruction error satisfying the anomaly threshold, concluding that the user's meta event behavior in session n is anomalous and elevating a risk assessment associated with the user's IT activities in session n; and in response to the normalized reconstruction error not satisfying the anomaly threshold, updating the baseline behavior model with the user's meta event activity from session n.

9. The non-transitory computer-readable medium of claim 8, wherein the dimension reduction technique is Principal Component Analysis (PCA).

10. The non-transitory computer-readable medium of claim 9, wherein the baseline behavior model P is the top K eigenvectors of $M^T M$.

11. The non-transitory computer-readable medium of claim 10, wherein normalizing the reconstruction error comprises dividing the reconstruction error by the sum of all eigenvalues in the baseline behavior model P.

12. The non-transitory computer-readable medium of claim 8, wherein elevating the risk assessment comprises adding points to a risk score for the user's logon session.

13. The non-transitory computer-readable medium of claim 8, wherein the events include a plurality of the following: log-on events, account-creation events, account-deletion events, account-password-change events, and events relates to access of machines, documents, and applications.

14. The non-transitory computer-readable medium of claim 8, wherein the threshold is set so that the normalized reconstruction error is above the threshold for between 0.4% and 0.6% of users in the network.

15. A computer system for detecting anomalous IT pattern and volume event behavior for a user during a period of time based on multiple data sources the system comprising:

one or more processors;

one or more memory units coupled to the one or more processors, wherein the one or more memory units store instructions that, when executed by the one or more processors, cause the system to perform the operations of:

creating a baseline behavior model P that captures a user's logon session pattern and volume of IT meta events over n logon sessions based on multiple data sources, wherein creating the baseline behavior model comprises:

receiving raw event logs from multiple data sources for a period of n logon sessions from sessions 0 to n−1;

categorizing raw event logs into meta events using an event taxonomy;

for each of the sessions 0 to n−1, creating a vector with a weighted count of each unique meta event observed in that logon session;

creating a matrix, M, with the vectors for sessions 0 to n−1; and modeling the data in the matrix (M) from session 0 to session n−1 using a dimension reduction technique to create the resulting baseline behavior model P;

determining whether there are anomalous pattern and volume changes in a user's IT behavior in session n using the baseline behavior model P, wherein the determining step comprises:

creating a vector, $f_n$, with a weighted count of each unique meta event observed in session n;

scoring the activity vector $f_n$ by measuring the magnitude of its reconstruction error as the difference between $f_n$ and $f_n PP^T$;

normalizing the reconstruction error; and comparing the normalized reconstruction error to an anomaly threshold;

in response to the normalized reconstruction error satisfying the anomaly threshold, concluding that the user's meta event behavior in session n is anomalous and elevating a risk assessment associated with the user's IT activities in session n; and in response to the normalized reconstruction error not satisfying the anomaly threshold, updating the baseline behavior model with the user's meta event activity from session n.

16. The system of claim 15, wherein the dimension reduction technique is Principal Component Analysis (PCA).

17. The system of claim 16, wherein the baseline behavior model P is the top K eigenvectors of $M^T M$.

18. The system of claim 17, wherein normalizing the reconstruction error comprises dividing the reconstruction error by the sum of all eigenvalues in the baseline behavior model P.

19. The system of claim 15, wherein elevating the risk assessment comprises adding points to a risk score for the user's logon session.

20. The system of claim 15, wherein the events include a plurality of the following: log-on events, account-creation events, account-deletion events, account-password-change events, and events relates to access of machines, documents, and applications.

21. The method of claim 15, wherein the threshold is set so that the normalized reconstruction error is above the threshold for between 0.4% and 0.6% of users in the network.

* * * * *